(12) United States Patent
Heerboth

(10) Patent No.: US 8,576,870 B2
(45) Date of Patent: Nov. 5, 2013

(54) ACCESS POINT SYSTEMS

(75) Inventor: Peter N. Heerboth, San Jose, CA (US)

(73) Assignee: Apple Inc., Cupertino, CA (US)

( * ) Notice: Subject to any disclaimer, the term of this patent is extended or adjusted under 35 U.S.C. 154(b) by 276 days.

(21) Appl. No.: 12/797,579

(22) Filed: Jun. 9, 2010

(65) Prior Publication Data

US 2011/0305227 A1    Dec. 15, 2011

(51) Int. Cl.
*H04L 12/28* (2006.01)
(52) U.S. Cl.
USPC .......................................................... 370/431
(58) Field of Classification Search
USPC .......................................................... 370/431
See application file for complete search history.

(56) References Cited

U.S. PATENT DOCUMENTS

| 7,966,036 B2 * | 6/2011 | Kojima ...................... 455/552.1 |
| 2008/0027814 A1 | 1/2008 | Kulakowski et al. | |

OTHER PUBLICATIONS

"Wi-Fi Certified TM Wi-Fi Direct; Frequently Asked Questions", 2009 Wi-Fi Alliance, [online], retrieved May 10, 2010, <http://www.wi-fi.org/files/20091019_Wi-Fi_Direct_FAQ.pdf>.

* cited by examiner

*Primary Examiner* — Chandrahas Patel
(74) *Attorney, Agent, or Firm* — Treyz Law Group; G. Victor Treyz; Michael H. Lyons

(57) ABSTRACT

Wireless local area networks may be established between devices. Each device may include wireless interfaces. A first device may include an infrastructure interface that supports an interface link with access point equipment on a given channel. The first device may listen for probe requests from a second device on the given channel. The second device may send probe requests on a series of channels in single-channel increments. When the second device sends the probe request on the given channel, the first device may receive the probe request. Each probe request may include an information element. The first device may extract the information element from a received probe request and may compare the extracted information element to a predetermined stored information element. If there is match, an association process may be used to establish a wireless link between the first and second devices.

18 Claims, 5 Drawing Sheets

ACCESS POINT SYSTEMS

BACKGROUND

This relates generally to wireless communications, and, more particularly, to ways in which to create wireless local area networks.

The Institute of Electrical and Electronics Engineers (IEEE) has promulgated wireless local area network standards that govern the protocols with which computers discover and associate with access points. These protocols are sometimes referred to as the IEEE 802.11 protocols or WiFi® protocols.

To simplify functions such as peer-to-peer connections and make other refinements to wireless local area networking procedures, there is an interest in developing other wireless networking protocols. For example, the WiFi Alliance® has supported a protocol called WiFi Direct.

The WiFi Direct protocol supports peer-to-peer connections, but specifies that devices that wish to be discoverable and that are not already participating in a group must spend a certain amount of time on a fixed listen channel (channel 1, 6, or 11) to respond to probe requests. As a result, a device with a single radio that wishes to be discoverable while simultaneously participating in an infrastructure network must split time between the channel on which the infrastructure network is operating and its listen channel. This channel hopping requirement reduces the amount of time a device is discoverable by peers, reduces throughput, and has the potential to increase power consumption.

It would be desirable to be able to avoid the penalties associated with this type of channel hopping while maintaining wireless local area network discoverability.

SUMMARY

Wireless local area networks may be established between devices. The devices may include computers, cellular telephones, portable electronic equipment, or other electronic devices. Each device may have wireless communications circuitry including a wireless transceiver and associated antenna structures.

To avoid channel hopping when supporting wireless discovery operations, a first device may listen for probe requests from a second device without changing the channel to which the wireless transceiver is tuned.

Each device may include wireless interfaces. For example, the first device may include an infrastructure interface that supports an interface link with access point equipment on a given channel. The first device may listen for probe requests from the second device on the given channel.

The second device may repeatedly send probe requests on a series of channels (i.e., all wireless local area network channels supported by the transceiver). The channels that are used to send the probe requests may be incremented in single-channel increments. This allows complete coverage of all available wireless local area network channels and ensures the one of the probe requests will eventually be sent on the given channel.

When the second device sends the probe request on the given channel, the first device can receive the probe request. Each probe request may include an information element that makes up part of an information element list. A valid predetermined information element may be maintained in storage in the first device. The first device may extract the information element portion of each received probe request and may compare each extracted information element to the predetermined information element. If there is match, an association process such as an IEEE 802.11 association process may be used to establish a wireless link between the first and second devices. If there is not a match, the received probe request can be ignored and the first device can continue listening for additional probe requests. Probe requests can be detected in this way without requiring the first device to transmit beacons. If desired, beaconing can be turned on once the second device has associated with the first device.

Further features of the invention, its nature and various advantages will be more apparent from the accompanying drawings and the following detailed description of the preferred embodiments.

DETAILED DESCRIPTION

Figure 1:
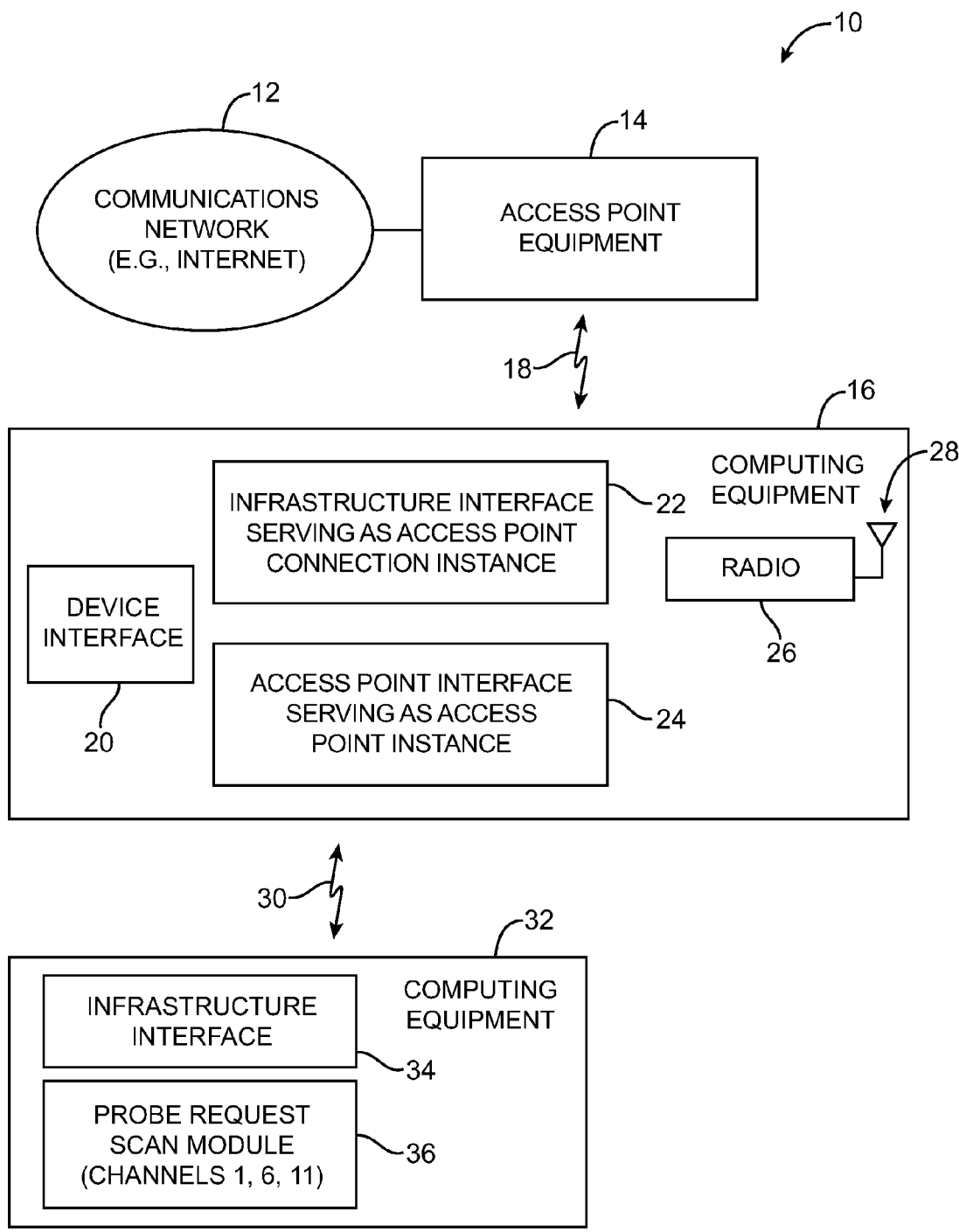
FIG. 1 is a diagram of a conventional wireless network.

A conventional wireless network is shown in FIG. 1. As shown in FIG. 1, wireless network 10 includes access point equipment 14. Access point equipment 14 may be, for example, a wireless router that is connected to a communications network such as the internet (network 12) through a modem. Devices such as computer 16 that have wireless local area network (WLAN) communications circuitry such as WLAN transceiver 26 and antenna 28 may form wireless local area network links with access point 14. Links such as link 18 are sometimes referred to as infrastructure links or access point (AP) mode links.

The WLAN communications circuitry of device 16 typically includes processing circuitry for running software code. For example, this circuitry may run multiple instances of an access point module. Infrastructure interface 22 may serve as an access point connection instance and may support communications between device 16 and access point equipment 14 over infrastructure link 18. Access point interface 24 may serve as an access point instance and may support communications between device 16 and device 32 over link 30. Device 32 may use infrastructure interface 34 to support communications over link 30.

During discovery operations before link 30 is formed, device 32 may issue probe requests to equipment 16. In a typical scenario, device 32 uses probe request scan module 36 to issue a repeating sequence of probe requests on WLAN channels 1, 6, and 11.

Device interface 20 is used by device 16 to handle corresponding listening responsibilities for device 16. In order to detect incoming probe requests, device 16 listens on a fixed listening channel selected from channels 1, 6, and 11. Because the probe requests from device 32 cycle through channels 1, 6, and 11 in sequence, there will eventually be a match between the channel on which device 32 is sending a probe request and the fixed listen channel. When device 16 detects an incoming probe request, device 16 and device 32 can set up link 30 using a standards-compliant protocol (i.e., WiFi Direct).

Transceivers such as transceiver 26 are generally only able to tune to a single WLAN channel at a time. Transceiver 26 must therefore be shared so that some of the time transceiver 26 is tuned to the infrastructure channel for link 18 and some of the time transceiver 26 is tuned to the fixed listen channel (which is often different than the infrastructure channel). When managing the sharing of transceiver resources in device 16, device interface 20 directs transceiver 26 to hop back and forth between these channels. To support infrastructure link 18, transceiver 26 is tuned to the infrastructure link channel. To support listening operations, transceiver 26 is tuned to the fixed listen channel. Channel hopping in this way reduces throughput on link 18, because transceiver 26 is not dedicated to supporting link 18. Discovery operations also tend to be slowed, because device 16 is only listening for probe requests part of the time.

Figure 2:
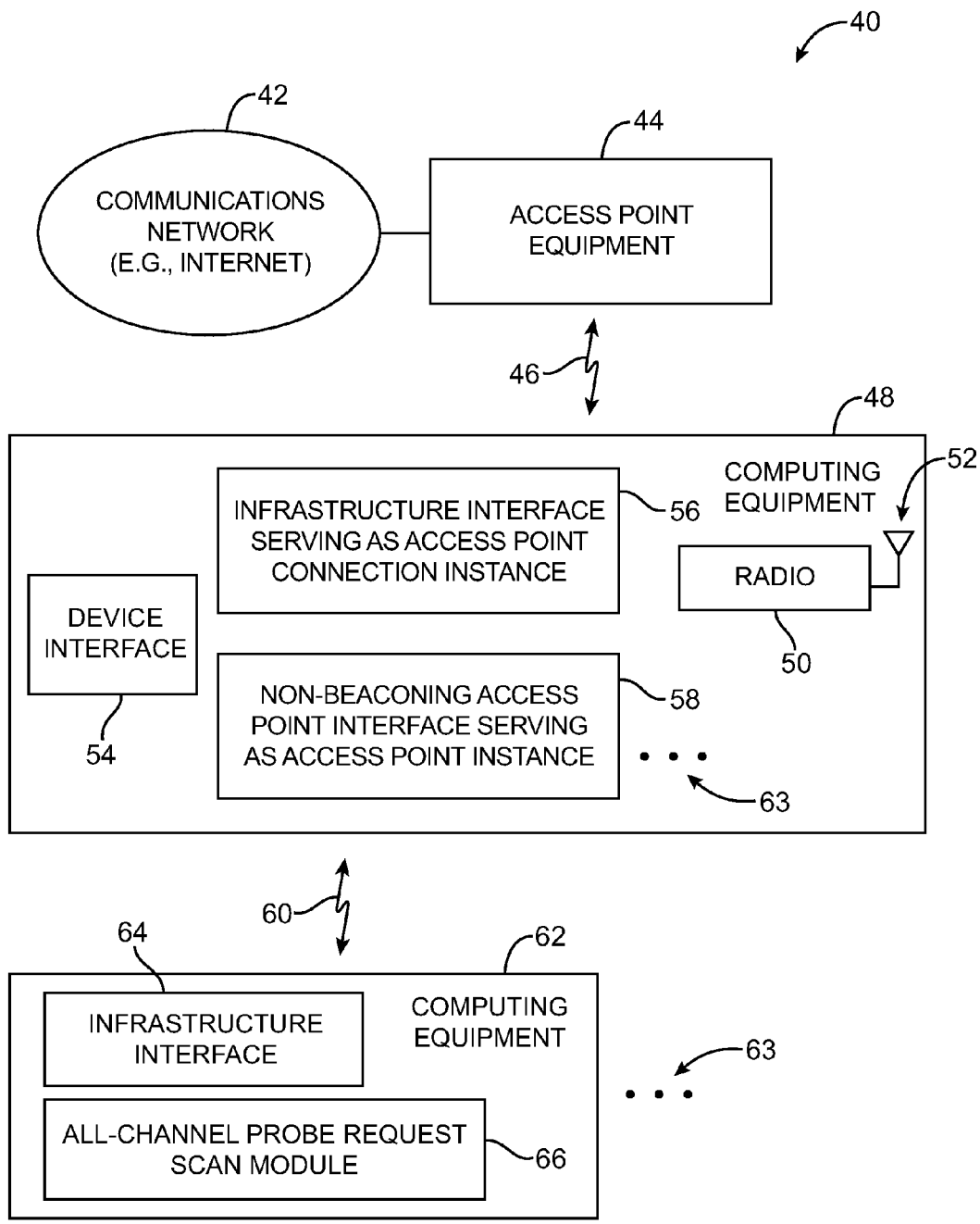
FIG. 2 is a diagram of a wireless network in accordance with an embodiment of the present invention.

These issues can be addressed using a wireless system of the type shown in FIG. 2. As shown in FIG. 2, wireless network 40 may include access point equipment 44. Access point equipment 44 may be a wireless router that is connected to a communications network such as the internet (network 42) through a modem, a computer serving as an access point, or any other suitable WLAN access point equipment.

Computing equipment 48 may be a portable computer such as a laptop computer or tablet computer, a cellular telephone or other handheld device, a desktop computer, a television, a computer monitor, or other electronic equipment that contains wireless communications circuitry.

Computing equipment 48 may sometimes be referred to as an electronic device.

Device 48 may have wireless local area network communications circuitry such as WLAN transceiver 50 and antenna 52. In a typical scenario, WLAN transceiver 50 may be based on a wireless circuit ("radio") that supports communications over a single WLAN channel at a time. Other types of configurations may be used if desired. For example, WLAN transceiver 50 may support multiple simultaneous WLAN channels.

WLAN wireless communications circuitry 50 and 52 may be used to form wireless links with access point 44. Links such as link 46 are sometimes referred to as infrastructure links or access point (AP) mode links.

The WLAN communications circuitry of device 48 (and, if desired, other processors in device 48) serve as processing circuitry for running wireless communications software code in device 48. This allows device 48 to run multiple instances of an access point module. For example, device 48 may include infrastructure interface 56 (serving as an access point connection instance) and one or more access point interfaces 58 (each serving as an access point instance). Infrastructure interface 56 may serve as an access point connection instance that supports communications between device 48 and equipment 44 over infrastructure link 46. Access point interface 58 may serve as an access point instance that can be used in supporting wireless link 60 with computing equipment 62.

Computing equipment 62 may be a computer, cellular telephone, or other electronic equipment that supports WLAN communications. As shown in FIG. 2, device 62 may have an infrastructure interface such as interface 64 to support communications with device 48 over WLAN link 60. Multiple devices may form links with device 48 using multiple access point interfaces in device 48, as indicated by dots 63.

Scan module 66 may be used by device 62 in sending probe requests to device 48 to set up a wireless link. To avoid channel hopping, device interface 54 may direct transceiver 50 to remain tuned to the channel that is being used to support infrastructure link 46 during discovery operations. To ensure that probe requests from device 62 are detected by device 48, device 62 may sequence through all available WLAN channels when sending probe requests. In particular, device 62 may use all-channel probe request scan module 66 to repeatedly send probe requests on channel 1, channel 2, channel 3, etc. in sequence. These probe requests can be received and processed by device 48 to establish a wireless link without requiring device 48 and access point interface 58 to transmit beacon frames. Accordingly, access point interface 58 may sometimes be referred to as a non-beaconing access point interface.

To ensure that device 48 and device 62 can establish link 60 without using the conventional approach of FIG. 1, all-channel probe request scan module 66 can include a predetermined information element in each probe request. Device 48 can store a copy of the predetermined information element value in advance. When a probe request is received, device 48 can extract the information element from the probe request and can compare the extracted information element to the stored information element. If the values of the extracted information element and the stored information element match, device 48 can proceed with establishing link 60 with device 62. If the value of the extracted information element does not match the value of the stored information element, device 48 need not take any action and the probe request can be ignored.

Figure 3:
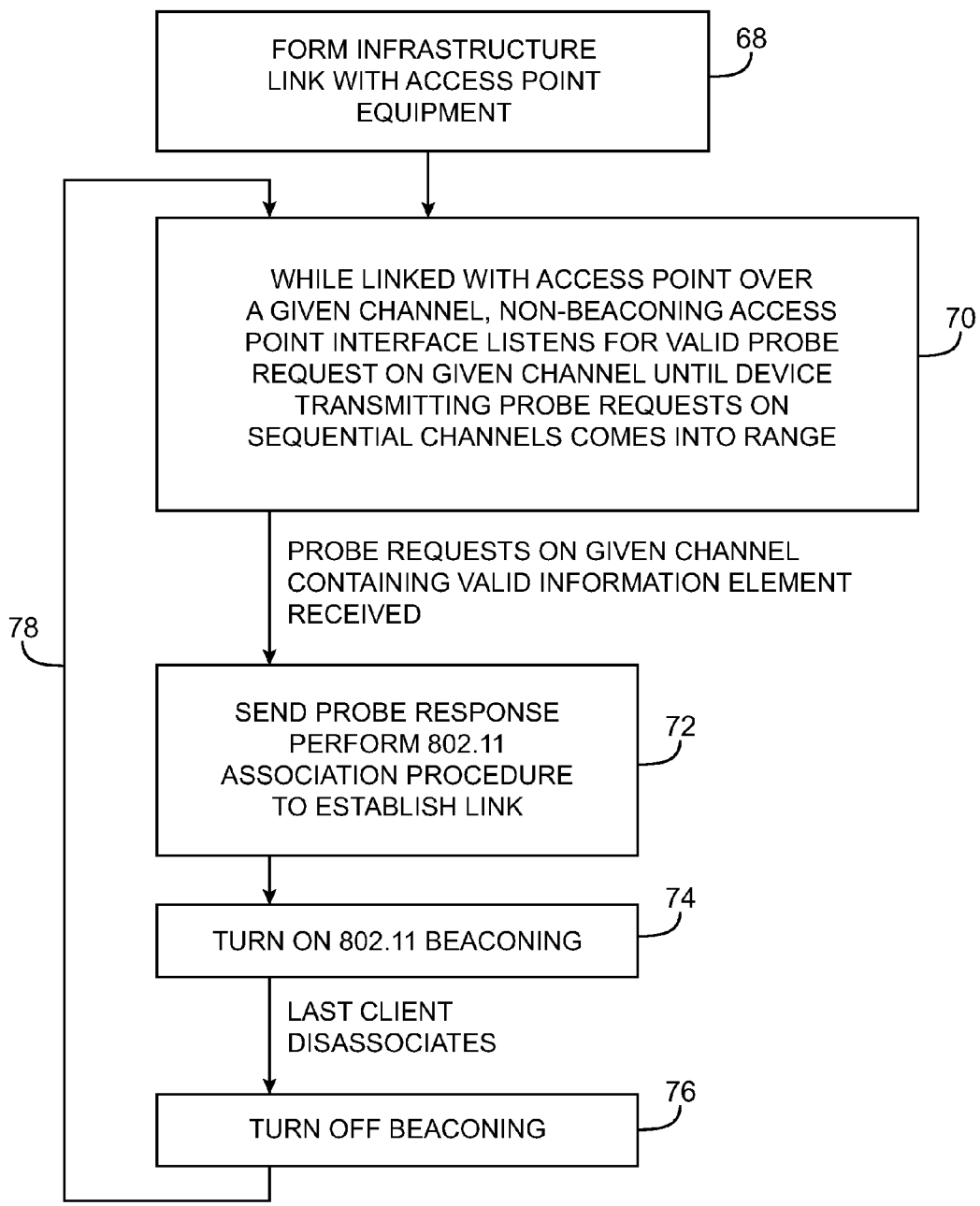
FIG. 3 is a flow chart of illustrative steps involved in supporting discovery and association operations in a network of the type shown in FIG. 2 in accordance with an embodiment of the present invention.

Illustrative steps involved in operating network 40 of FIG. 2 are shown in FIG. 3.

At step 68, device 48 may form WLAN infrastructure link 46 with access point equipment 44. Infrastructure interface 56 may be used in supporting communication with equipment 44. Link 46 may be formed on a given WLAN channel (e.g., one of the IEEE 802.11 2.4 GHz or 5 GHz channels such as channel 13 as just one example). Link 46 allows device 48 to access network resources through access point equipment 44. In the example of FIG. 2, link 46 may be used by device 48 to access internet 42. If desired, other resources may be accessed through access point equipment 44. Multiple devices such as device 48 may be connected to equipment 44. The arrangement of FIG. 2 in which one device (device 48) is coupled to equipment 44 is merely illustrative.

At step 70, while device 48 is linked with access point equipment 44 over infrastructure link 46 using the given channel, non-beaconing access point interface 58 may listen for a probe request from module 66 on the given channel. It is not necessary for transceiver 50 to be tuned to a different channel during the listening operations of step 70. This allows device 48 to maintain its throughput on the given channel over link 46 while supporting discovery operations.

To link to equipment 48, device 62 may, during the operations of step 70, use scan module 66 to issue wireless probe requests. Before link 60 is established, device 62 does not know the identity of currently used infrastructure channel (the given channel used by device 48 in communicating with equipment 44). Probe request scan module 66 may therefore scan in sequence through all channels (i.e., all IEEE 802.11 channels). For example, scan module 66 may step through the channels one by one in sequential order without skipping channels. With this approach, probe requests are transmitted using a series of contiguous adjacent channels (i.e., channel 1, channel 2, channel 3, etc.). The process may be repeated continuously (i.e., scan module 66 may transmit probe requests on all channels in a repeating sequence of channels in single-channel increments).

Each probe request may include an information element (i.e., an information element having a predetermined value). Device 48 may have storage in which this predetermined information element value is stored and may have processing circuitry that determines when the information element in a probe request has a value that matches the value of the stored information element and is therefore valid. When a probe request with a matching information element (i.e., a valid probe request) is received, processing may proceed to the operations of step 72.

During the operations of step 72, device 48 may, in response to receiving the valid probe request, send a wireless probe response to device 62 and may perform WLAN association procedures (e.g., IEEE 802.11 association procedures) to establish WLAN link 60 between device 48 and device 62. Access point interface 58 in device 48 and infrastructures interface 64 in device 62 support communications over link 60. When the link is formed, equipment 62 and 48 can share files and other resources such as access to network 42. Links such a link 60 may sometimes be referred to as peer links. Additional links may be formed after link 60 has been formed (e.g., using the WiFi Direct protocol).

To support the formation of additional wireless links between device 48 and additional devices (e.g., using standards compliant protocols), WLAN beaconing may be turned on at step 74 (e.g., IEEE 802.11 beaconing may be activated so that beacon frames are transmitted device 48). The beacon frames may contain service set identifier (SSID) information and other beacon data. Additional devices can detect the beacons and can use information from the beacons in associating with device 48. Whenever a device dissociates from device 48, the wireless link between the dissociating device and device 48 is dropped. When all devices drop their links with device 48 (i.e., when device 48 is only wirelessly linked to access point equipment 44), beaconing may be turned off in device 48 (step 76). As indicated by path 78, processing may then return to step 70 (i.e., device 48 can once again await reception of valid probe requests).

Figure 4:
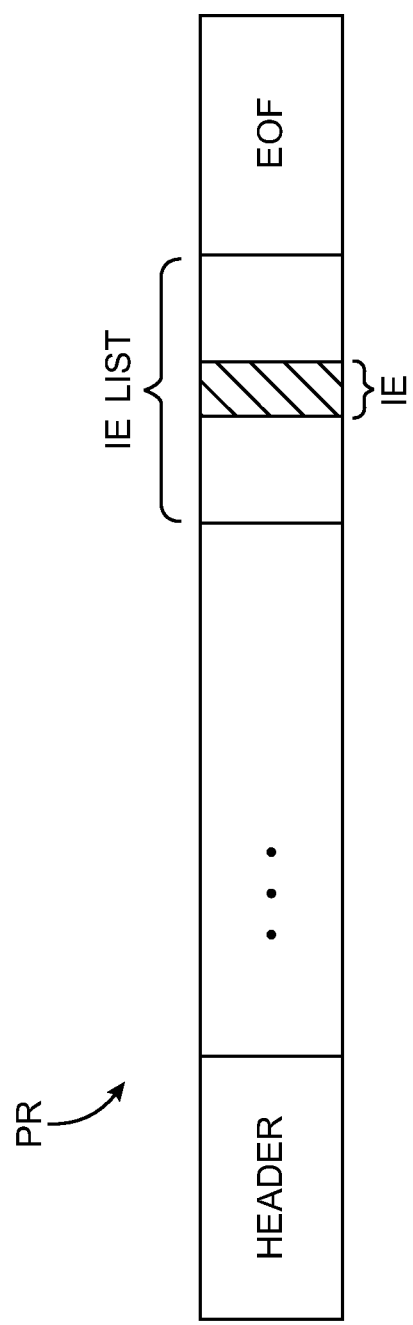
FIG. 4 is a diagram showing how a probe request frame of the type that may be used in the system of FIG. 3 may contain an information element that is recognized by appropriately configured access points in accordance with an embodiment of the present invention.

FIG. 4 shows an illustrative probe request (PR) frame. As shown in FIG. 4, probe request PR may contain header information and end of frame information. The payload of the frame may reside between the header and the end of frame information. Part of the payload may include an information element list (IE list). The information element (IE) that is extracted by device 48 during probe request processing may be one of the entries in the information element list. Any unique digital code (e.g., a binary bit pattern or an alphanumeric string) may be used as the information element.

Figure 5:
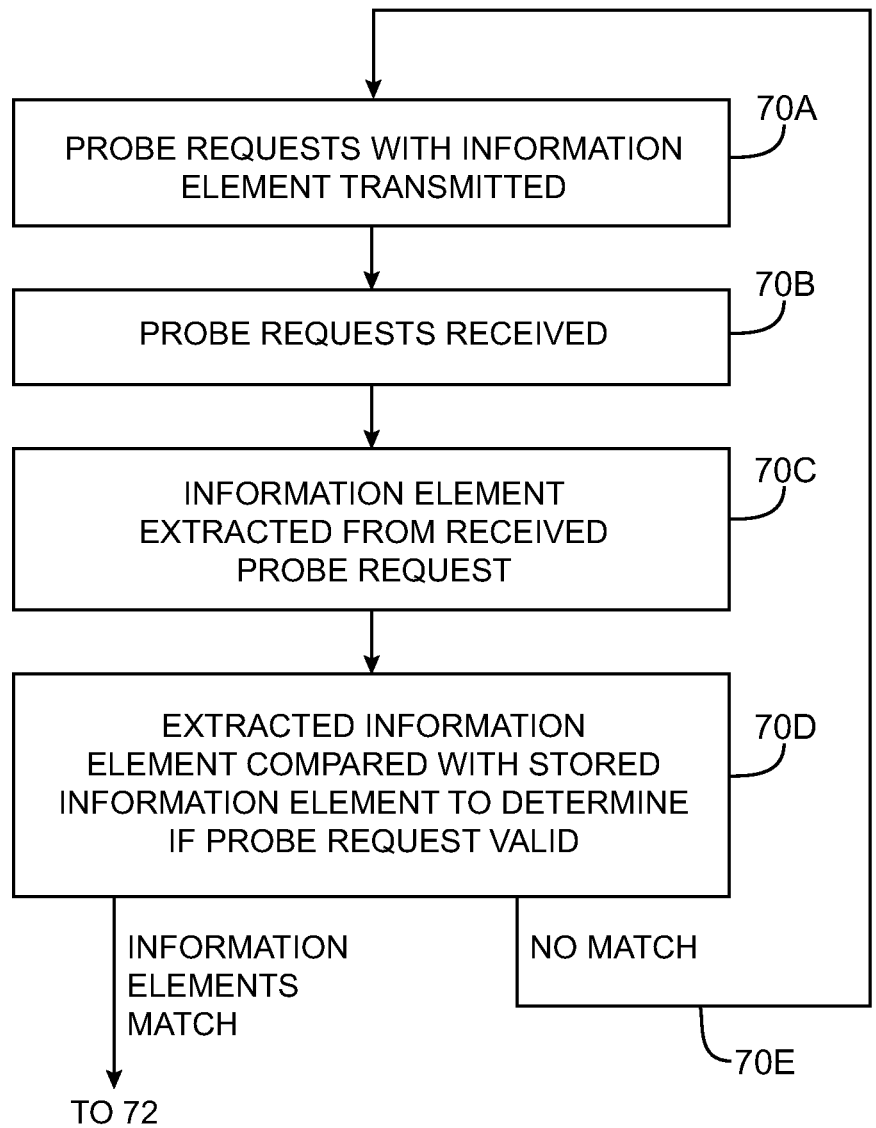
FIG. 5 is a flow chart of illustrative steps involved in processing probe requests in accordance with an embodiment of the present invention.

FIG. 5 is a flow chart of illustrative steps that may be used during the operations of step 70 of FIG. 3.

At step 70A, device 62 may transmit a probe request containing an information element IE while device 48 uses interface 58 to listen for probe requests from device 62 on a given wireless local area network channel (i.e., the current channel for infrastructure link 44). The given wireless local area network channel need not be one of the probe request channels used in conventional system 10 of FIG. 1 (i.e., channels 1, 6, and 11). For example, device 48 and equipment 44 may be linked over channel 13 (as an example). The probe requests sent at step 70A may be sent as a series of probe requests on a sequence of channels that are incremented in single-channel increments (i.e., channels 1, 2, 3, 4, 5, etc.). In a typical configuration, the channels are all adjacent and no channels are skipped in the sequence. This ensures that one of the channels that are used will match the current channel (i.e., channel 13 in this example).

At step 70B, while non-beaconing access point interface 58 is listening for incoming probe requests on the given wireless local area network channel, a transmitted probe request may be received over the given wireless local area network channel (i.e., when the transmit channel for the probe request matches the current channel to which transceiver 50 is tuned). Device 48 may then proceed to process the received probe request.

In particular, the information element IE may be extracted from the received probe request at step 70C.

At step 70D, device 48 may retrieve its previously stored valid information element from storage in device 48 and may compare the value of this predetermined information element to the value of the extracted information element. If the extracted information element does not match the stored information element, device 48 can ignore the probe request and processing can return to step 70A (as indicated by line 70E). If the extracted information element is a valid match with the predetermined information element that was retrieved from storage, device 48 can conclude that the information element and the probe request in which the information element was contained are valid and that link 60 should be formed. Processing may therefore proceed to step 72 of FIG. 3.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for supporting wireless networking between a first electronic device and a second electronic device, wherein the second electronic device sends a series of probe requests to the first device on a sequence of channels incremented in single-channel increments, each of the probe requests including an information element, the method comprising:

with the first device, maintaining a first wireless local area network link with access point equipment using a given wireless local area network channel;

with the first device, listening for probe requests from the second device on the given wireless local area network channel;

with the first device, receiving a probe request from the second device;

with the first device, extracting the information element from the probe request and comparing the extracted information element to a predetermined information element to determine whether the extracted information element matches the predetermined information element; and in response to determining that the extracted information element matches the predetermined information element, establishing a second wireless local area network link between the first device and the second device without the access point equipment.

2. The method defined in claim 1 wherein maintaining the first wireless local area network link comprises maintaining an infrastructure link.

3. The method defined in claim 2 further comprising:

in response to establishing the second wireless local area network link, turning on beaconing in the first device.

4. The method defined in claim 3, further comprising turning off beaconing when the first device is wirelessly linked to only the access point equipment.

5. The method defined in claim 3 wherein maintaining the first wireless local area network link comprises maintaining a link on a channel other than channels 1, 6, and 11.

6. The method defined in claim 1 further comprising:
in response to establishing the second wireless local area network link, turning on beaconing in the first device.

7. The method defined in claim 6, further comprising turning off beaconing when the first device is wirelessly linked to only the access point equipment.

8. The method defined in claim 1 wherein maintaining the first wireless local area network link comprises maintaining a link on a channel other than channels 1, 6, and 11.

9. The method defined in claim 1 wherein listening for probe requests from the second device on the given wireless local area network channel comprises listening for probe requests from the second device on the given wireless local area network channel using a non-beaconing access point interface.

10. A method for supporting wireless networking between a first electronic device and a second electronic device, wherein the second electronic device sends probe requests to the first device that each include an information element, the method comprising:
with the first device, receiving a probe request from the second device; and
with the first device, extracting an information element from the probe request;
with the first device, comparing the extracted information element to a predetermined information element stored in the first device to determine whether the extracted information element matches the predetermined information element; and
in response to determining that the extracted information element matches the predetermined information element, establishing a wireless local area network link between the first device and the second device without access point equipment; and
while receiving the probe request from the second device on a given wireless local area network channel, communicating wirelessly between the first device and the access point equipment using the given wireless local area network channel.

11. The method defined in claim 10, wherein the second electronic device sends the probe requests to the first device as a series of probe requests on a sequence of wireless local area network channels incremented in single-channel increments and wherein the sequence of wireless local area network channels includes the given wireless local area network channel.

12. The method defined in claim 11 wherein extracting the information element comprises extracting the information element from an information element list in the probe request.

13. The method defined in claim 12 wherein receiving the probe request comprises receiving the probe request using a non-beaconing access point interface in the first device.

14. The method defined in claim 10 further comprising:
in response to establishing the wireless local area network link, turning on beaconing in the first device.

15. The method defined in claim 14 wherein establishing the wireless local area network link between the first device and the second device comprises performing IEEE 802.11 association procedures.

16. A method for supporting wireless local area networking between a first electronic device and a second electronic device, the method comprising:
with the second electronic device, sending a series of probe requests to the first device on a sequence of channels incremented in single-channel increments, wherein each of the probe requests includes an information element that is part of an information element list;
with the first device, receiving a probe request from the second device;
with the first device, extracting the information element from the probe request and comparing the extracted information element to a predetermined information element stored at the first device to determine whether the extracted information element matches the predetermined information element; and
in response to determining that the extracted information element matches the predetermined information element, establishing a wireless local area network link between the first device and the second device.

17. The method defined in claim 16 further comprising:
with the first device, maintaining a wireless local area network infrastructure link with access point equipment using a given wireless local area network channel; and
with the first device, listening for the probe requests from the second device on the given wireless local area network channel.

18. The method defined in claim 17 further comprising:
in response to establishing the wireless local area network link, turning on beaconing in the first device.

* * * * *